United States Patent [19]

Blanding et al.

[11] Patent Number: 4,557,798

[45] Date of Patent: Dec. 10, 1985

[54] TELEVISION TUBE WITH OPTIONAL SHADOW MASK AND METHOD OF MANUFACTURE

[75] Inventors: Wendell S. Blanding, Painted Post, N.Y.; Ronald E. Johnson, Tioga, Pa.; Robert V. Van Dewoestine, Corning, N.Y.

[73] Assignee: Corning Glass Works, Corning, N.Y.

[21] Appl. No.: 427,514

[22] Filed: Sep. 29, 1982

[51] Int. Cl.[4] .......................... B44C 1/14; B32B 31/00; C03C 15/00; B41C 1/06

[52] U.S. Cl. .................................... 156/660; 156/235; 156/233; 156/240; 156/277; 156/249; 101/34; 313/470

[58] Field of Search ............... 156/230, 235, 240, 241, 156/249, 289, 277, 659.1, 654, 658, 660, 344, 541; 313/470; 101/34, 37; 428/914

[56] References Cited

U.S. PATENT DOCUMENTS

| | | | |
|---|---|---|---|
| 4,263,085 | 4/1981 | Ellis | 156/235 |
| 4,379,818 | 4/1983 | Lock et al. | 156/659.1 |
| 4,440,589 | 4/1984 | Lock | 156/235 |
| 4,440,590 | 4/1984 | Collins | 156/240 |

OTHER PUBLICATIONS

Garwin, IBM Technical Disclosure, vol. 25, No. 5, Oct. 1982, p. 2598.

*Primary Examiner*—Edward Kimlin
*Assistant Examiner*—Louis Falasco
*Attorney, Agent, or Firm*—B. R. Turner

[57] ABSTRACT

A TV bulb and method of manufacture are disclosed. A collector printing process is utilized for applying TV phosphor compounds with associated black background to the inner face of the TV panel. Also, an offset printing process is utilized for printing an acid resist ink on both sides of a TV aperture mask after it has been formed into an approximate spherical or cylindrical shape. Masks and panels produced in accordance with the present invention are interchangeable during bulb manufacture.

5 Claims, 11 Drawing Figures

TELEVISION TUBE WITH OPTIONAL SHADOW MASK AND METHOD OF MANUFACTURE

BACKGROUND OF THE INVENTION

The invention relates to a TV picture tube and method of manufacture. More particularly, there is provided a color TV picture tube panel having a black matrix and color phosphors printed thereon, and an optional mask produced by a printing technique. Preferably, a collector silicone process is utilized for applying a target comprising color phosphor compounds and a black matrix onto the inner face of the curved TV panel. The shadow mask is produced using a new process wherein acid resist is applied by an offset printing technique.

In a conventional color TV bulb, the black matrix background and color phosphors of the target are separately applied to the panel in a succession of relatively complex process steps. The process requires the use of a mask having apertures formed therein by a photo-etch process. The mask is thereafter stamped into shape. The mask and panel are mated and become a unique combination for the particular TV bulb.

In the preferred process of the present invention, a resist ink pattern is printed on both sides of the mask after it has been formed into the desired sperical or cylindrical shape. The mask may be thereafter etched. Because forming takes place before etching, the structure is not subjected to significant deformations after the apertures are in place. Thus, the possibility exists that masks can be constructed which are interchangeable with various panels of similar manufacture.

In the present invention, the application of the target onto the panel is reduced to a single step. The color phosphors and background inks are printed onto a silicone collector in the pattern of the target. Thereafter, the target may be printed from the collector onto the panel. A major advantage of the collector process is that registration is accomplished on the collector independently of the panel.

The process herein described is compatible with conventional TV tubes having a shadow mask and more recently developed TV tubes of the beam-indexing type (i.e. maskless picture tubes).

SUMMARY OF THE INVENTION

A color TV bulb and method of manufacture is disclosed wherein a collector printing process is utilized for printing the target, comprising color phosphors and black matrix inks, onto the TV panel.

A preformed shadow mask is printed on both sides with a coating of an acid resist ink in a selected pattern. The mask is then acid treated. Portions of the mask not coated with the ink dissolve, thereby producing an aperture array in the mask corresponding to the selected patterns.

The inks are specially formulated thermoplastic pressure sensitive media. Masks and panels produced in accordance with the present invention are interchangeable.

FIGS. *2a*, *2b*, and *2c* are sequential drawings showing printing from a flexible membrane to the inside of a color TV panel.

Figure 3:
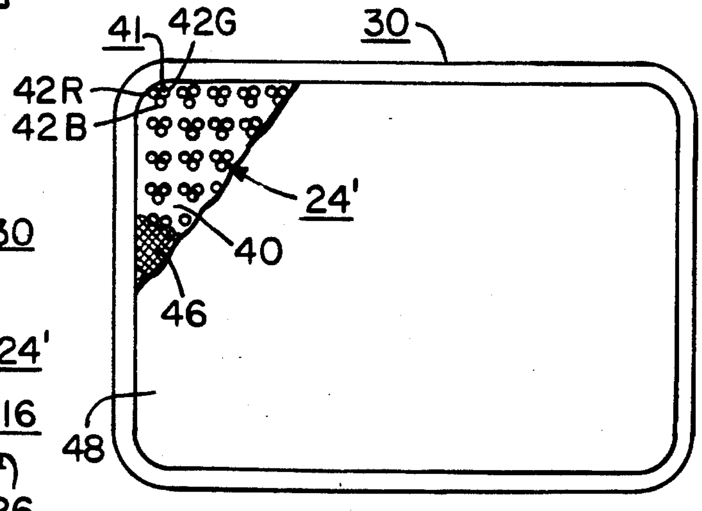

FIG. 3 is a schematic plan view of the panel with an exemplary few triads of color dots and a portion of the black matrix illustrated.

Figure 4:
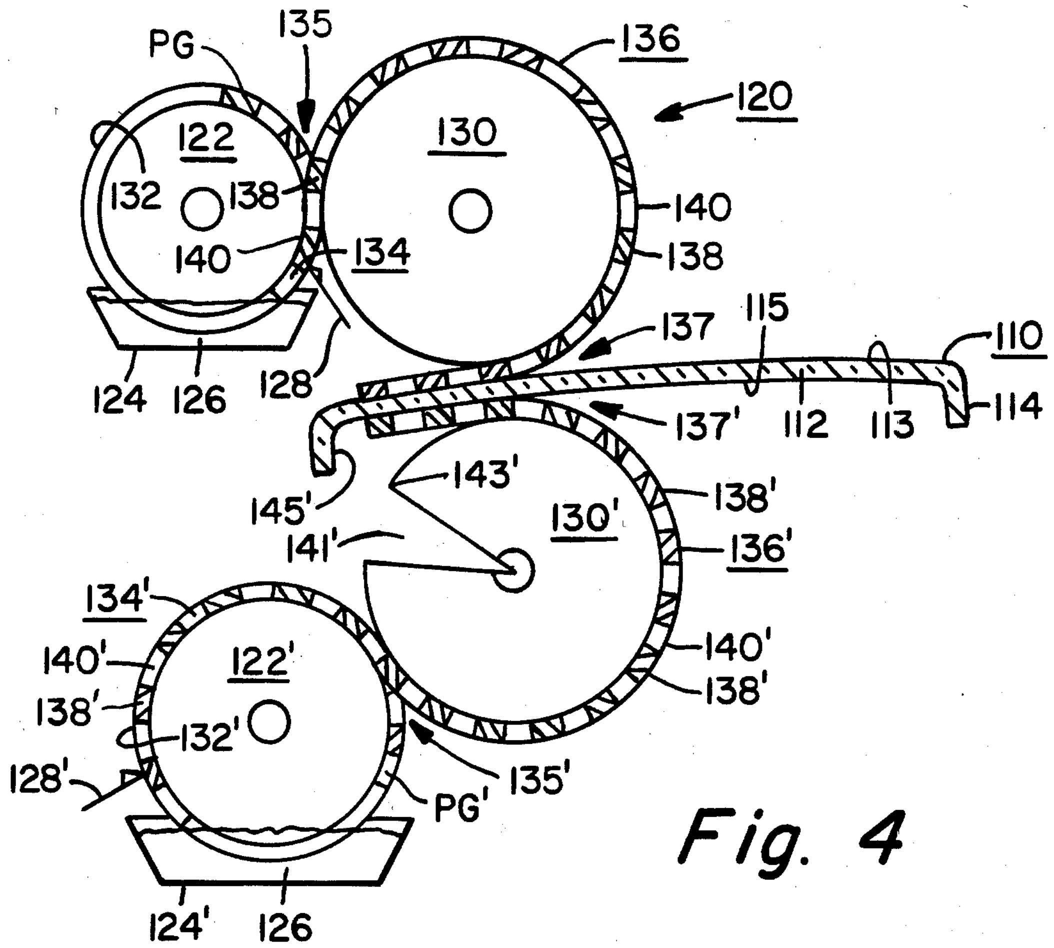

FIG. 4 is a fragmented schematic representation in side section of a printing apparatus and a preformed and framed shadow mask.

Figure 5:
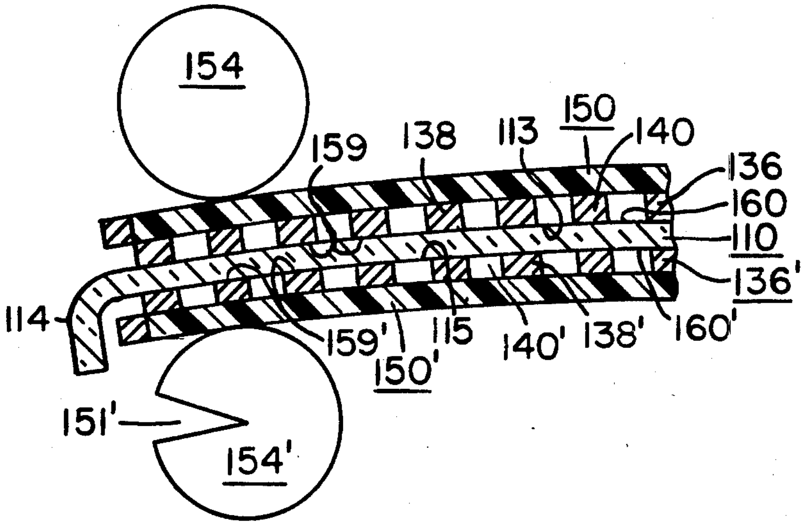

FIG. 5 shows an alternate method of printing opposite sides of a shadow mask using flexible membrane printing.

Figure 6:
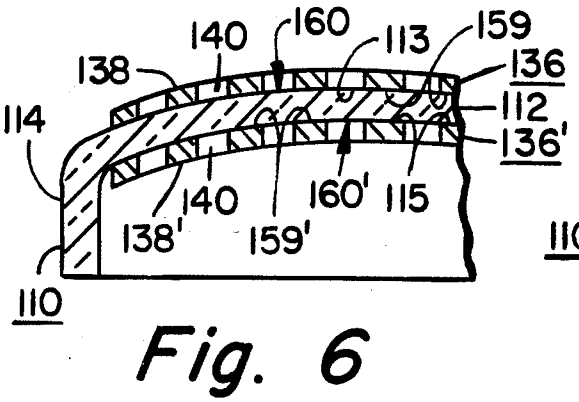

FIG. 6 is a schematic representation of the shadow mask after printing.

Figure 7:
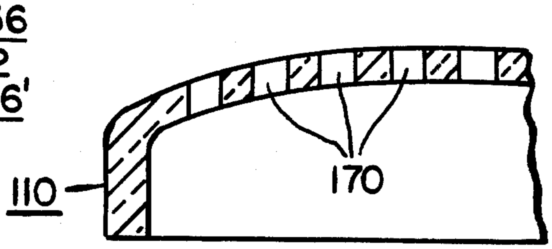

FIG. 7 shows the shadow mask of FIG. 6 after etching and cleaning.

Figure 8:
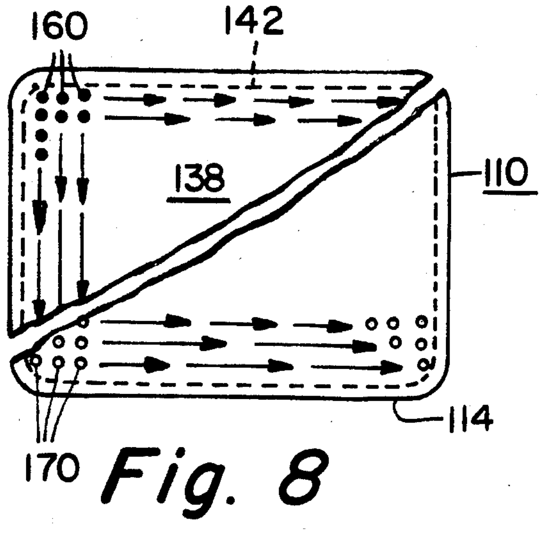

FIG. 8 is a fragmented front view of the shadow mask of the present invention before and after etching.

Figure 9:
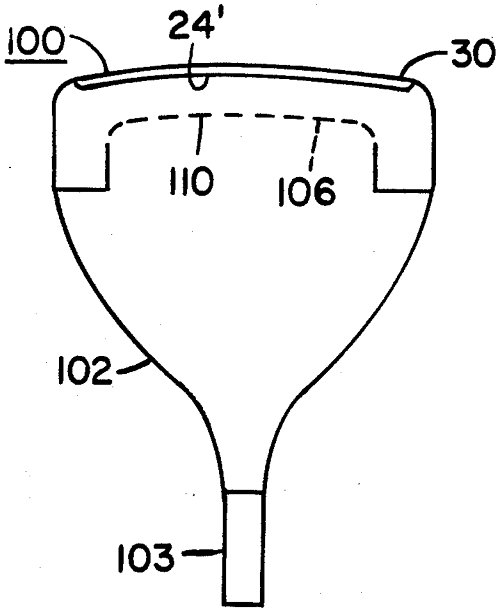

FIG. 9 schematically illustrates a TV picture tube produced from components manufactured in accordance with the techniques described herein.

DESCRIPTION OF THE PREFERRED EMBODIMENT

Panel Manufacture

The present invention uses separately formulated inks to print the target of a TV panel. The inks comprise a heat-processable, thermoplastic, pressure-sensitive, hot-melt medium mixed with a selected pigment. Preferred media are disclosed in copending U.S. patent application Ser. No. 202,648, filed 10-31-80. The preferred media melt when heated above room temperature and form cohesive, pressure-sensitive, tacky films when cooled to near room temperature. The pigments are conventional materials used in the TV industry, namely: green, red, and blue phosphors for the colors and a black graphite for the black matrix or background.

A preferred printing device is a gravure printer as disclosed in the copending U.S. patent application Ser. No. 332,726, filed 12-21-81 now U.S. Pat. No. 4,440,589. The printing device includes a collector; transfer surfaces; and corresponding heated gravure surfaces, which receive melted thermoplastic, pressure-sensitive ink from separate heated supplies.

Each gravure surface has a different recessed gravure pattern etched therein for receiving a corresponding ink from its separate supply. Because the gravure surface is heated, the inks remain melted when in contact therewith. The corresponding transfer surface is formed of an elastomeric silicone material and contacts the hot fluid ink in the recessed gravure pattern. The ink splits almost evenly between the two surfaces, leaving an impression of the pattern on the transfer surface. The ink immediately cools upon contact with the transfer surface and forms a cohesive, pressure-sensitive, tacky film. The transfer surface, carrying the tacky film, is intimately contacted with the collector formed of an elastomeric silicone material. The ink transfers completely from the transfer surface to the collector.

The separate patterns developed by the separate gravure surfaces are printed on the collector in registration. This means that each separate ink pattern is printed on the collector in a specific geometric relation with each of the other ink patterns. Registration is accomplished by alignment of the components. When all of the inks are printed on the collector in the proper relation, the target is established. Once established, the target may be completely transferred to the panel by intimate contact of the collector with said panel.

The complete and successive transfer of the separate inks occurs for a number of reasons. The inks are tacky. They tend to stick to almost anything they come in contact with. The respective transfer surface, the collector and the panel are formulated so that they each have increasing affinity for the inks. The inks form cohesive films when cool. Thus, when transfer occurs, it is complete because the film holds together. The films neither split nor tear.

Figure 1:
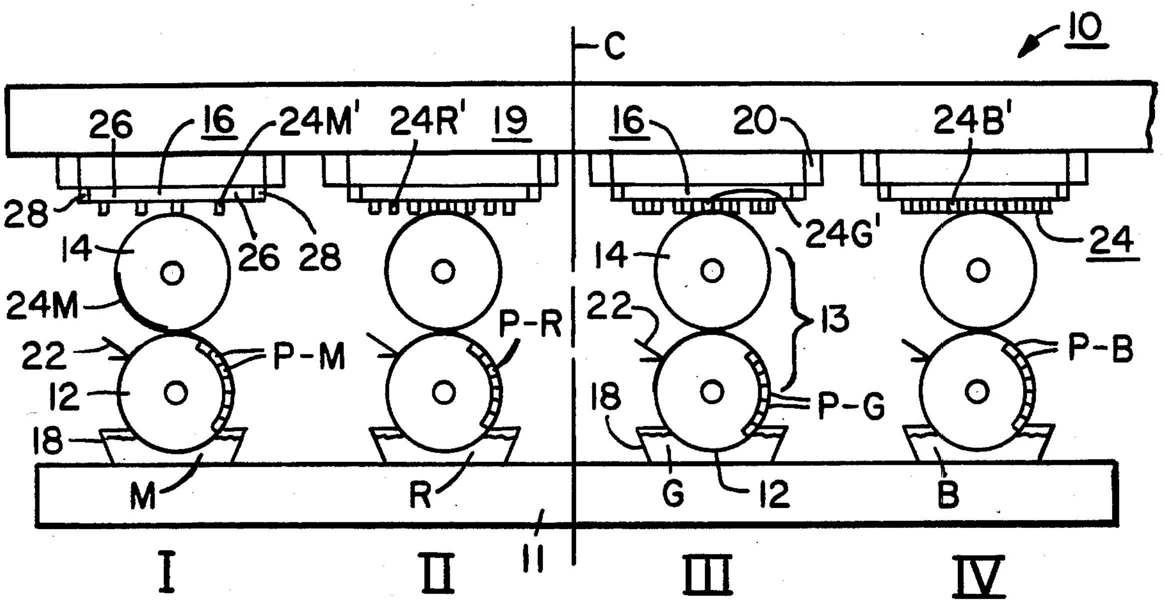
FIG. 1 is a schematic representation of a collector printing process adapted for use in the present invention.

FIG. 1 is a schematic drawing exemplary of a printing device 10 described in U.S. patent application Ser. No. 332,726.

The present invention utilizes at least four printing stations I–IV, one for each color phosphor and one for the black matrix. Each printing station I–IV includes: a heated ink trough 18; a heated gravure roll 12 and a transfer roll 14 mounted in pairs 13 on base plate 11 by means not shown; and a doctor blade 22. A turret 19, mounted for rotation about a central axis C, carries collectors 16 in holders 20. Each collector 16 includes a flexible silicone membrane 26 secured in a frame 28. Each ink trough 18 carries a separate ink formulation for deposition onto a gravure roll 12 (e.g., M-black matrix, R-red, G-green, and B-blue).

Each gravure roll 12 has a selected pattern etched therein. For example, at station I gravure roll 12 has a pattern P-M corresponding to the desired configuration of the black matrix. The black ink M carried in heated trough 18 is a melted, graphite filled, thermoplastic fluid. The ink M, deposited on gravure roll 12 at station I, is doctored a conventional manner by blade 22. Ink M in pattern P-M on gravure roll 12 is carried into intimate contact with transfer roll 14, whereupon the ink M is split between such rolls. The ink M, deposited onto cool transfer roll 14, forms a tacky cohesive film 24M wherein the pattern P-M is reproduced on transfer roll 14. The film 24M is brought into intimate contact with collector 16. In this instance, the ink M forming film 24M does not split, but completely transfers from the transfer roll 14 to the collector 16. The pattern P-M, generated on gravure roll 12, is thereby formed on collector 16 as film 24M'.

The above process is repeated at stations II, III and IV for the remaining inks R, G, and B. Respective patterns P-R, P-G and P-B are reproduced in the corresponding collector 16 as films 24R', 24G' and 24B' and deposited in registration onto the collector 16 as a composite film 24. There is no print back from any collector 16 to any of the transfer rolls 14. The collector has a higher affinity for the ink than the transfer rolls 14.

Figure 2A:
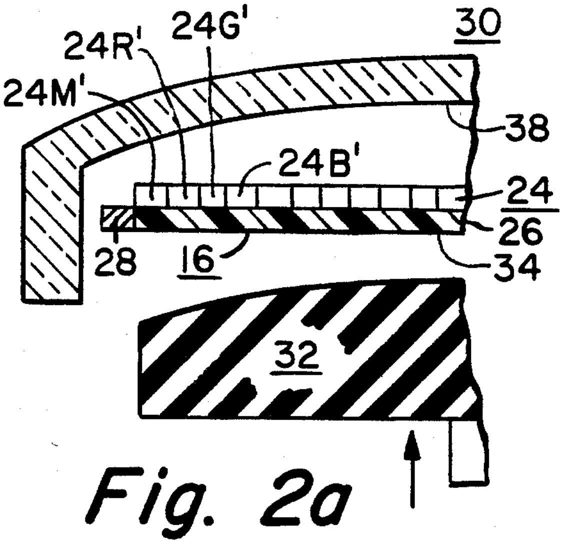
Figure 2B:
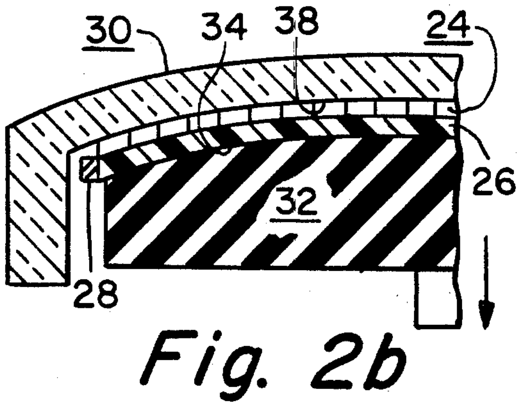
Figure 2C:
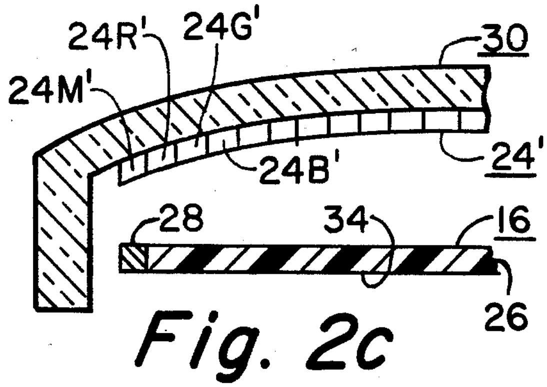

The collector 16, carrying the composite film 24, is removed from holder 20 and is locked in position within a TV panel 30 by means not shown (see FIG. 2*a*). Flexible plunger 32 engages a rear side 34 of membrane 26, urging the membrane 26 and film 24 carried thereby against an inside surface 38 of panel 30 (see FIG. 2b). The film 24 preferentially adheres to the inside surface 38 of panel 30. The plunger 32 is thereafter withdrawn. The membrane 26 relaxes and peels away from the film 24 which forms target 24' (see FIG. 2*c*).

In FIG. 3 an illustrative portion of target 24' is shown. The target 24' comprises black matrix 40 and triads 41 formed of a green dot 42G, a red dot 42R and a blue dot 42B. The black matrix 40 corresponds to the pattern P-M generated by gravure roll 12 at station I using ink M. The dots 42R, 42G and 42B correspond respectively to the patterns P-R, P-G, and P-B generated at stations II–IV.

The target 24' is finished with an organic sealant 46 and sputtered aluminum reflective conductive coating 48. The panel 30 is fired, and the organic materials forming the various ink media are burned off. The inorganic pigments forming the target 24', and the aluminum coating 18 are fixed to the panel 30.

In another embodiment, the collector 16 may be a fiberglass reinforced silicone blanket (not shown). Also transfer of the film 24 to the panel 30 may be effected by applying pressure with a cut roll (not shown) on the opposite side of the membrane 34 on the blanket.

Aperture Mask Manufacture

FIGS. 4–8 illustrate aperture mask printing and manufacture. Resist inks are deposited on the mask after it is formed in the required shape. Resist inks utilized may be pressure-sensitive hot-melt inks which exhibit sufficient adhesion and acid resistance to serve as satisfactory acid resists in their cooled ambient state. The inks may be pressure-sensitive hot-melt inks which are capable of crosslinking or curing to enhance their acid resistance. Latent catalysts may be added to the inks, which catalysts are selected not to induce curing at temperatures below about 300° F. Once curing occurs, the inks may be referred to as thermoset materials. Waxes may also be employed as suitable resist inks.

A member that prints the resist ink onto the mask may be a roll, blanket, membrane, or pad, having a silicone working surface. Gravure or flexographic techniques may be useful. The mask receives the resist ink directly from a heated metal inking surface, or through an intermediate offset or transfer roll. Transfer of the ink to the mask is effected by causing intimate mechanical contact between the mask and the transfer member carrying the ink. Intimate contact may be accomplished by urging the transfer member against the metal surface of the mask.

In FIG. 5, there is illustrated a fragmented side view of an aperture mask 110 having a preformed cylindrical or spherical shadow mask portion 112 and peripherially attached frame 114. The frame 114 may be an internally formed bead, as shown, or a separately welded ring. The shadow mask portion 112 has respective front and back sides 113 and 115, each of which receives a printed coating as hereafter described.

In the present invention an offset gravure printing apparatus 120 is disclosed for printing the respective front and back sides 113 and 115 of the mask 110. The printing apparatus 120 requires similar elements for printing the respective front and back sides 113 and 115 of the mask 110. Such similar elements, hereinafter described, will be referred to by the same descriptive name but with the reference numerals in the elements used to print the back side 115 of mask 110 being primed counterparts of the elements used for printing the front side 113 thereof.

The printing apparatus 120 includes heated gravure rolls 122-122', heated troughs 124-124', melted thermoplastic ink 126 (the same material for both sides) in heated troughs 124-124', doctor blades 128-128' and silicone elastomeric offset rolls 130-130'. A surface 132-132' of each gravure roll 122-122' is etched or engraved with a pattern PG-PG'. The ink 126 is deposited on each gravure roll 122-122' and any excess is removed in a known manner by corresponding doctor blade 128-128'. The ink 126 remaining on each roll 122-122' forms a film 134-134' in a pattern corresponding to the etchings PG-PG' in each respective gravure roll 122-122'.

Although exaggerated in thickness and the dimensions, each film 134-134' has respective solid portions 138-138' and aperture portions 140-140'. Each offset roll 130-130' contacts the corresponding gravure roll 122-122' as shown, and picks up the film 134-134' by splitting action (see reference numerals 135-135'). Each offset roll 130-130' is preferably cool. The film 134-134', freezes upon contact with the offset roll 130-130' thereby forming a respective patterned cohesive film 136-136' thereon.

The ink 126 forming cohesive films 136-136' is tacky at near room temperature. Each cohesive film 136-136' is transferred completely from the corresponding offset roll 130-130' to the respective front and back side 113 and 115 of aperture mask 110 upon intimate contact (see reference numerals 137-137'). The offset rolls 130-130' act as mutual backing members as mask 110 is passed therebetween during the printing operation.

The offset roll 130', used for printing the back side 115 of mask 110, has a cut 141' formed therein. Cut 141' allows the offset 130' to clear the frame 114. Also the offset roll 130' may be oriented so that a leading edge 143' of the cut 141' engages the back side 115 of mask 110 near where the frame 114 and mask portion 112 meet at inside corner 145'.

In another preferred embodiment, plain inking rolls may be substituted for gravure rolls 122-122', and raised patterned flexographic rolls may be substituted for offset rolls 130- 130'.

In FIG. 5 the aperture mask 110 may be printed using flexible blankets or membranes as collectors 150-150'. Respective cohesive films 136-136' may first be deposited into collectors 150-150' by a gravure process. Each cohesive film 136-136' may thereafter be deposited on the respective front and back sides 113 and 115 of mask by urging the collectors 150-150' and the respective cohesive films 136-136' into intimate contact with opposite front and back sides 113 and 115 of the mask 110. Opposed rolls 154-154' urge the respective collectors 150-150' against the mask 110. The rolls 150-150' act as complimentary backing members for each other. The roll 154' may have cut 151' for allowing it to clear frame 114. The cohesive films 136-136' have a greater affinity for the mask 110 than respective collectors 150-150' and thus transfer to the mask 110 as integral cohesive films.

In FIG. 6 the cohesive films 138-138' are shown after deposition onto the opposite sides 113 and 115 of the mask 110. The cohesive films 136-136' are printed onto the shadow mask portion 112 so that solid portions 138-138' from coated areas 159-159' and aperture portions 140-140' leave uncoated areas 160-160'. The respective aperture portions 140-140' and solid portions 138-138' are in alignment or registration. The respective uncoated portions 160-160' of the mask 110 are aligned in registration, one opposite the other, on the respective front and back sides 113 and 115 of the mask 110. Thus, the exposed portions 160-160' are subjected to acid etching whereby through holes 170 may be made (see FIG. 7).

In FIG. 8 the aperture mask 110 is shown in two fragmented parts of a front elevation. In the upper part of the drawing, prior to acid etching, the cohesive film 138 is shown deposited onto the front side 113 of the aperture mask 110 with exposed portions 160 of the same shown as darkened circles. In the lower portion of the drawing, after acid etching, the exposed portions 160 of the aperture mask 110 have been dissolved, creating holes or apertures 170 therein, shown as open circles. It should be understood that the etching takes place from both sides of the aperture mask 110. Once etching is complete, the aperture mask 110 is thoroughly cleaned and rinsed for removing acid and ink therefrom (see FIG. 7). The interchangeable aperture mask 110 of the present invention is thus completed.

A preferred ink 126 is disclosed in the following example.

| Material | Parts/Wt. |
|---|---|
| EPON 1001 (Shell) | 60 |
| FC 431 (3M) | 1 |
| Z6040 (Dow-Corning) | 2 |
| Dicyandiamide | 1 |
| Dibutyl Phthalate | 25 |
| K745 Black (Ferro) | 25 |
| Print at between 125–175° F. | |
| Cure for ½ hour at 300–500° F. | |

In the example, the ink 126 is a heat processable hot melt, thermoplastic (thermosetting above 300° F.), pressure-sensitive material. The ink melts with heat and solidifies upon cooling. It cures and becomes thermosetting once cross-linking occurs above 300° F. The ink 126 may be formulated to become tacky at near room temperature so that a pressure-sensitive cohesive film may be produced. The ink 126 may also be formulated to preferentially stick to one surface over another. Thus, in the present invention, ink 126 preferentially sticks to the mask 110 and releases from the offset rolls 130-130'. Similarly if intermediate surface carriers are used, for example, collectors 150-150', the surfaces against which the ink 126 preferentially adheres are formulated to provide adherence in a specific order.

In FIG. 9 a picture tube 100 is shown schematically in side section. The tube 100 includes the panel 30 with target 24' printed thereon, mask 110 with an aperture pattern 106 manufactured as hereinbefore described, and a conventional funnel 102 and gun 103. If a tube 100 is manufactured using a beam indexing gun, the mask 110 is not used. Thus, the mask 110 becomes an optional feature.

Conventional means, not shown, may be used to fix the panel 30 and mask 110 in a desired spacial relation. Each panel 30 is interchangeable with any other mask 110 of the same model tube. That is, the respective target 24' and aperture pattern 106 are designed to work together in a particular picture tube arrangement.

Unless otherwise stated, the patents and applications for patents referred to above are assigned to the assignee herein and are to be considered incorporated herein by reference.

We claim:

1. A method of producing a colored TV bulb including a panel and an aperture mask, with said panel having a composite of a black matrix pattern and respective red, blue and green color phosphor patterns deposited thereon, comprising the steps of:

formulating separate thermoplastic ink compositions for each of the black matrix and color phosphors, said inks exhibiting cohesive strength and pressure sensitivity at near room temperature;

forming each composition into a corresponding separate pattern;

establishing the black matrix and respective color phosphors in separate ink patterns on separate carriers from the separate inks;

completely transferring the separate patterns onto at least one collector and registerably combining said separate patterns into the composite on such collector;

completely transferring the composite from the collector to the panel;

forming a metal sheet into a desired shape having a shadow mask portion;

printing opposite sides of the shadow mask portion with an acid resist material in a desired aperture pattern;

acid etching the mask portion for producing apertures in said mask portion not covered by the acid resist material;

and forming an aperture mask which is interchangeable with a panel having said composite so formed thereon.

2. A method as set forth in claim 1 further comprising the steps of: depositing a conductive relective film over the composite after it has been transferred to the panel; and firing the panel and composite film for volatalizing organic compounds to thereby permanently affix the film and the reflective coating onto the panel.

3. A method as set forth in claim 1 further comprising the steps of: formulating the acid resistant material and inks from heat processable thermoplastic compositions.

4. A method as described in claim 3 wherein printing the panel and the shadow mask further comprises the steps of: depositing the thermoplastic compositions in the corresponding desired patterns onto a corresponding transfer surface for the corresponding side of the shadow mask portion and the panel to be printed; and intimately contacting the transfer surface with the corresponding surface of the mask portion, whereby said thermoplastic composition preferentially adheres to the corresponding surface and releases from the transfer surface during such intimate contact.

5. A method as described in claim 3 wherein the heat processable thermoplastic compositions for printing the shadow mask portion are selected to lose their thermoplastic properties upon curing above about 300° F. thereby enhancing their acid resistant properties.

* * * * *